United States Patent
Qin et al.

(10) Patent No.: US 12,032,672 B2
(45) Date of Patent: Jul. 9, 2024

(54) IMAGE VERIFICATION METHOD AND APPARATUS, ELECTRONIC DEVICE AND COMPUTER-READABLE STORAGE MEDIUM

(71) Applicant: BAIDU ONLINE NETWORK TECHNOLOGY (BEIJING) CO., LTD., Beijing (CN)

(72) Inventors: Yangyang Qin, Beijing (CN); Guoxian Zhang, Beijing (CN); Yejing Zhou, Beijing (CN); Libao Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 496 days.

(21) Appl. No.: 17/209,022

(22) Filed: Mar. 22, 2021

(65) Prior Publication Data

US 2021/0209215 A1    Jul. 8, 2021

(30) Foreign Application Priority Data

Jul. 21, 2020 (CN) .......................... 202010706587.3

(51) Int. Cl.
    *G06F 21/36* (2013.01)

(52) U.S. Cl.
    CPC ...... *G06F 21/36* (2013.01); *G06F 2221/2133* (2013.01)

(58) Field of Classification Search
    CPC ............. G06F 21/36; G06F 2221/2133; G06F 3/0481; G06F 3/04845; H04L 63/083
    See application file for complete search history.

(56) References Cited

U.S. PATENT DOCUMENTS 8,918,851 B1 * 12/2014 Iannamico .............. G06F 21/36
                                                        726/7
2012/0323700 A1    12/2012 Aleksandrovich et al.
(Continued)

FOREIGN PATENT DOCUMENTS

CN      107454049 A     12/2017
CN      108846274 A     11/2018
(Continued)

OTHER PUBLICATIONS

Rich Gossweiler and Maryam Kamvar and Shumeet Baluja, "What's Up CAPTCHA? A CAPTCHA Based on Image Orientation", pp. 841-850, [retrieved on Feb. 16, 2024]. Retrieved from: dl.acm.org, Apr. 20-24, 2009 (Year: 2009).*
(Continued)

*Primary Examiner* — Carl G Colin
*Assistant Examiner* — Hany S. Gadalla
(74) *Attorney, Agent, or Firm* — MORRISON & FOERSTER LLP

(57) ABSTRACT

According to an embodiment of the present application, there is provided an image verification method and apparatus, an electronic device and a computer-readable storage medium, which can be applied to the technical field of network security and the field of image processing and recognition. The image verification method includes: displaying a first image portion and a second image portion, the first image portion being rotatable with respect to the second image portion, the first image portion and the second image portion being obtained by cropping an original image and rotating the cropped first image portion with respect to the second image portion; receiving an operation for rotating the first image portion; rotating the first image portion based on the operation; and determining whether an angle of the first image portion relative to the second image portion matches (Continued)

with the original image, in response to determining that the operation is ended.

18 Claims, 10 Drawing Sheets

(56) References Cited

U.S. PATENT DOCUMENTS

| | | | |
|---|---|---|---|
| 2013/0036457 | A1 | 2/2013 | Vandemar |
| 2013/0039484 | A1* | 2/2013 | Sun .................. G06T 1/005 380/28 |
| 2019/0332760 | A1* | 10/2019 | Liu .................. G06F 9/451 |
| 2021/0387094 | A1* | 12/2021 | Young .................. A63F 13/87 |

FOREIGN PATENT DOCUMENTS

| | | |
|---|---|---|
| CN | 109063453 A | 12/2018 |
| CN | 109242018 A | 1/2019 |
| CN | 109767376 A | 5/2019 |
| CN | 109887046 A | 6/2019 |
| CN | 110308847 A | 10/2019 |
| CN | 110572369 A | 12/2019 |

OTHER PUBLICATIONS

Authors et. al.: Disclosed Anonymously "A new CAPTCHA and unlock method by rotating concentric circular pictures", [retrieved on Feb. 16, 2024]. Retrieved from: IP.com, May 11, 2015 (Year: 2015).*

Office Action received for European Patent Application No. 21164036.2 mailed on May 12, 2022, 7 pages.

Office Action received for Japanese Patent Application No. 2021-091221 issued on May 16, 2022, 8 pages.

Extended European Search Report received for European Patent Application No. 21164036.2 mailed on Sep. 2, 2021, 9 pages.

* cited by examiner

IMAGE VERIFICATION METHOD AND APPARATUS, ELECTRONIC DEVICE AND COMPUTER-READABLE STORAGE MEDIUM

CROSS-REFERENCE TO RELATED APPLICATION

This application claims priority to Chinese patent application No. 202010706587.3, filed on Jul. 21, 2020, which is hereby incorporated by reference in its entirety.

TECHNICAL FIELD

The present application relates to a computer technology, and more particularly, to an image verification method and apparatus, an electronic device, and a computer-readable storage medium, which may be applied to the technical field of network security and the field of image processing and recognition.

BACKGROUND

A security verification code, derived from Turing testing, is an automated way to distinguish between a human user and a computer. Every year, Internet enterprises suffer losses ranging in the order of millions to hundreds of millions due to computer attacks, and in China, the market scale of security-related black ash products in 2019 alone reached hundreds of billions in size. An Internet platform has developed a verification code technology to ensure the security of accounts and services. As a result of the development in recent years, a verification code has evolved from early texts and graphics to today's sliders and puzzles, with certain improvements in user experience and interception capability. However, with the development of AI technology, the ability of lawbreakers to crack a verification code has been significantly improved. In particular, for character recognition, image recognition, target detection, and the like, an attacker cracks a verification code by means of natural language processing (NLP) technology and computer vision (CV) technology at a cost getting lower and lower.

SUMMARY

According to an embodiment of the present application, there is provided an image verification method and apparatus, an electronic device, and a computer-readable storage medium.

In a first aspect of the present application, there is provided an image verification method, which may include: displaying a first image portion and a second image portion, the first image portion being rotatable with respect to the second image portion, the first image portion and the second image portion being obtained by cropping an original image and rotating the cropped first image portion with respect to the second image portion; receiving an operation for rotating the first image portion; rotating the first image portion based on the operation; and determining whether an angle of the first image portion relative to the second image portion matches with the original image, in response to determining that the operation is ended.

In a second aspect of the present application, there is provided an image verification method, which may include: sending a first image portion and a second image portion to a client, to cause the client to display the first image portion and the second image portion, the first image portion being rotatable with respect to the second image portion, the first image portion and the second image portion being obtained by cropping an original image and rotating the cropped first image portion with respect to the second image portion; receiving, from the client, an angle of the rotated first image portion relative to the second image portion; and determining whether the angle matches with the original image.

In a third aspect of the present application, there is provided an image verification apparatus, which may include: an image displaying module configured for displaying a first image portion and a second image portion, the first image portion being rotatable with respect to the second image portion, the first image portion and the second image portion being obtained by cropping an original image and rotating the cropped first image portion with respect to the second image portion; an operation receiving module configured for receiving an operation for rotating the first image portion; an image rotation module configured for rotating the first image portion based on the operation; and a matching determination module configured for determining whether an angle of the first image portion relative to the second image portion matches with the original image, in response to determining that the operation is ended.

In the fourth aspect of the present application, there is provided an image verification apparatus, which may include: an image sending module configured for sending a first image portion and a second image portion to a client, to cause the client to display the first image portion and the second image portion, the first image portion being rotatable with respect to the second image portion, the first image portion and the second image portion being obtained by cropping an original image and rotating the cropped first image portion with respect to the second image portion; an angle receiving module configured for receiving, from the client, an angle of the rotated first image portion relative to the second image portion; and a second matching determination module configured for determining whether the angle matches with the original image.

In a fifth aspect of the present application, there is provided an electronic device, which may include: at least one processor; and a memory communicatively connected with the at least one processor; wherein, the memory stores instructions executable by the at least one processor, the instructions being executed by the at least one processor to enable the at least one processor to execute the method according to the first or second aspect of the present application.

In a sixth aspect of the present application, there is provided a non-transitory computer-readable storage medium storing computer instructions, wherein the computer instructions cause a computer to perform the image verification method according to the first or second aspect of the present application.

It should be understood that what is described in the Summary section is not intended to limit the key or critical features of the embodiments of the present application, nor is it intended to limit the scope of the present application. Other features of the present application will become readily apparent from the following description.

BRIEF DESCRIPTION OF THE DRAWINGS

The foregoing and other objects, features and advantages of the present application will become more apparent through more detailed descriptions of exemplary embodiments of the present application taken in combination with the drawings, wherein like reference numerals generally represent like parts throughout the exemplary embodiments of the present application. It should be understood that the drawings are included to provide a better understanding of the present application and are not to be construed as limiting the present application. In the drawings.

Throughout the drawings, the same or corresponding reference numerals represent the same or corresponding parts.

DETAILED DESCRIPTION

Figure 1:
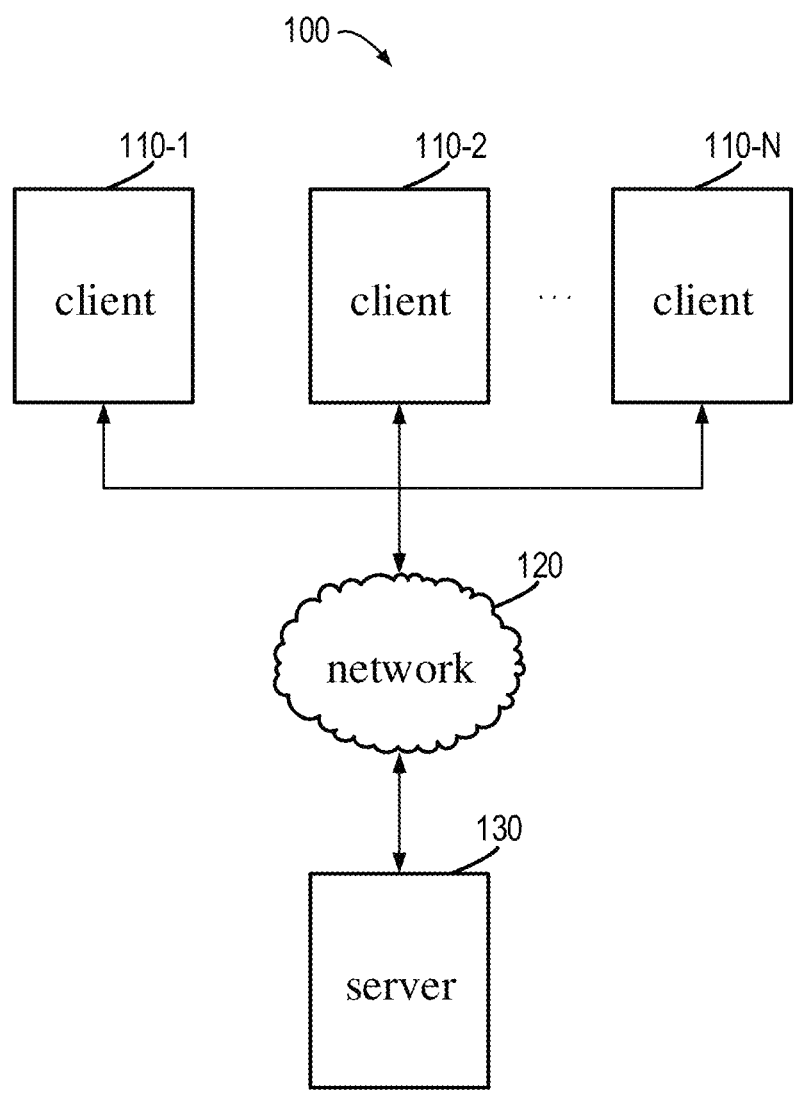
FIG. 1 illustrates a schematic diagram of an image verification system 100 in which image verification methods in some exemplary embodiments of the present application may be implemented.

Preferred embodiments of the present application will be described in more detail below with reference to the drawings. Although the preferred embodiments of the present application are shown in the drawings, it should be understood that the present application may be implemented in various forms and should not be limited to the embodiments set forth herein. Rather, these embodiments are provided so that the present application will be thorough and complete, and will fully convey the scope of the present application to those skilled in the art.

As used herein, the term "comprising" and variations thereof are meant to be inclusive, i.e., "including, but not limited to". The term "or" means "and/or", unless specifically stated otherwise. The term "based on" means "based at least in part on". The terms "one example embodiment" and "one embodiment" mean "at least one example embodiment". The term "another embodiment" means "at least one further embodiment". The terms "first", "second" and the like may refer to different or the same objects. Other explicit and implicit definitions are also possible below.

In order to improve the verification code interception effect, on a technical level, verification data can be collected as much as possible, and a variety of parameter verifications and behavior modelings can be carried out. In terms of product interaction, difficulty of semantic understanding of a computer can be increased, and difficulty of visual recognition of the computer can be improved. However, traditional verification code interception technologies have a variety of problems such as limited defense effect, product-dependent interaction design, reduced user experience of normal users and the like.

As described above in the Background, the traditional verification code interception technologies have a variety of problems such as limited defense effect, product-dependent interaction design, reduced user experience of normal users and the like. Specifically, in order to effectively intercept computer attacks, the main research directions of the traditional verification code interception technologies include behavior modeling, increasing the difficulty of semantic understanding and increasing the difficulty of visual recognition. However, the traditional verification code interception technologies still have the following disadvantages:

(1) A method of performing a parameter verification and behavior modeling by collecting more parameters. By adopting such method, a server side embeds parameters into inherent information such as a user cookie in a case where a user begins to access a page, and then verifies the integrity, the attribution and the like of the parameters when the user requests. With this method, ordinary attackers can be intercepted, but for attackers who have a ability to tamper with page request parameters, because they can construct reasonable request parameters at will, the defense effect of this method is very limited. With the development of machine learning, a behavior modeling method has been introduced into more and more parameter verifications, in which a recognition model is trained by marking existing attacks, and then the attack behaviors are recognized in real time. However, the collection of effective behaviors requires the user to conduct more page interactions, which depends more on the interaction design of a product.

(2) A method of increasing the difficulty of semantic understanding of a computer. In the early days, the main defense way of a verification code was to recognize characters, such as English letters and numbers in an image, which was mainly aimed at recognizing content on the image, and there was almost no difficulty in semantic understanding. With the introduction of an optical character recognition (OCR) technology into computer simulation attack, the difficulty of recognition is significantly reduced. Afterwards, the verification way gradually starts to adopt the four arithmetic operation on the basis of the original contents, so as to increase the verification difficulty. Nowadays, many verification codes have evolved into more complex semantics, such as location judgment, color judgment, common sense judgment, hotspot judgment and the like. With the increasing difficulty of semantic understanding, although it can increase the difficulty of attack to the computer to a certain extent, it also greatly reduces the product experience of normal users. Even in verification methods such as common sense judgment and hotspot judgment and the like, a computer based on machine learning can complete verification faster and more accurately than the normal users, and the interception effect is poor.

(3) A method of increasing the difficulty of visual recognition of a computer. In addition to increase the difficulty of semantic understanding, there is further a method for improving the ability of attack interception, which is to increase the difficulty of visual recognition of a computer, so that the computer can hardly visually recognize a verification result even if it understands a verification purpose. Existing verification methods include text recognition, gesture recognition, position recognition, background recognition and the like. This kind of verification code has a certain interception ability with respect to a traditional attack to the computer, but with the development of the computer vision technology, it is no longer difficult to do above recognition on a complete image, and the computer has already possessed the ability to bypass the above visual verification.

In order to at least partially address one or more of the above and other potential problems, the embodiments of the present application propose an image verification method and apparatus adopting two image portions which are rotatable relatively or even have a gap therebetween, and propose a new way of user interaction as well as an integrated security verification system integrating parameter verification and behavior modeling. With the method proposed in the embodiment of the present application, a user can complete an image verification by a simple dragging interaction, and on the basis of not affecting the recognition of human users, the difficulty of semantic understanding and the difficulty of visual recognition of a computer can be increased, and the attack to the computer can be effectively intercepted.

FIG. 1 illustrates a schematic diagram of an image verification system 100 in which image verification methods in some exemplary embodiments of the present application may be implemented. The image verification system 100 may include a plurality of clients 110-1, 110-2, ..., 110-N (hereinafter referred to collectively as the client 110, where N is a natural number greater than 1). The image verification system 100 may further include a server 130. The client 110 and the server 130 perform operations such as data transmission and interaction through a network 120. The client 110 may be an electronic device supporting a visualized interaction operation, such as a smart phone, a laptop, a desktop computer, a tablet computer, a smart television, an audio electronics with a screen, a personal digital assistant (PDA) and the like. Examples of the network 120 may include, but be not limited to, the Internet, a corporate Intranet, a local area network, a mobile communication network, and a combination thereof. It should be noted that the image verification system 100 is extendable, which may include more servers 130, and may even include more kinds of networks 120. For reasons of simplicity of illustration, only one server 130 and one network 120 are shown in FIG. 1.

In accordance with some embodiments of the present application, a user may use the client 110 to perform an image verification, to enable operations such as logging into a system or application, validating information, sending information and the like, and implements the above operations by interacting with the server 130. According to other embodiments of the present application, the client 110 may also not interact with the server 130, but the operation of image verification may be completed locally at the client 100.

Figure 2:
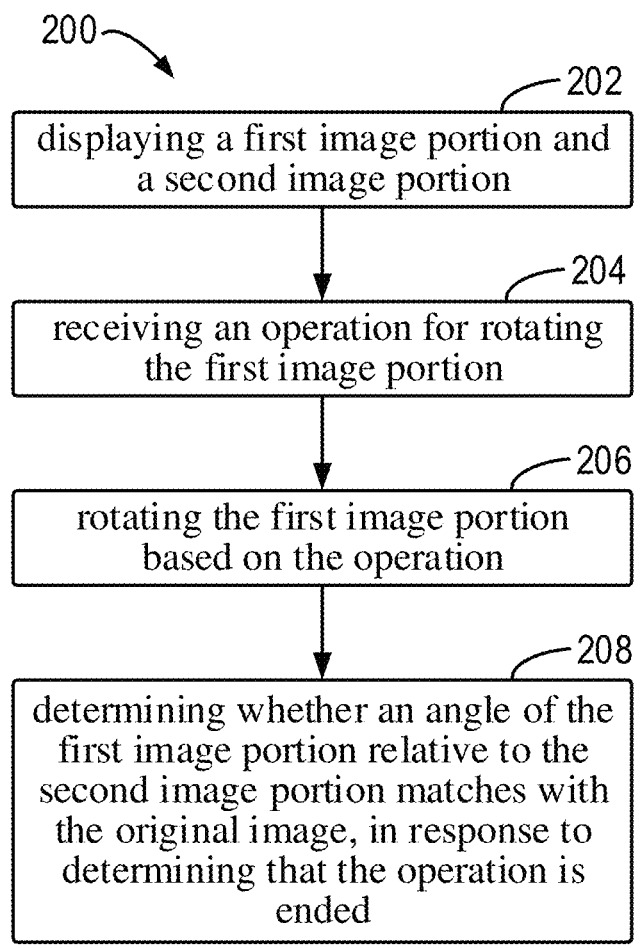
FIG. 2 illustrates a flowchart of an image verification method 200 in accordance with an embodiment of the present application.

FIG. 2 illustrates a flowchart of an image verification method 200 in accordance with an embodiment of the present application. Specifically, the image verification method 200 may be performed by the image verification system 100. It should be understood that the image verification method 200 may also include an additional operation not shown and/or may omit an illustrated operation, and the scope of the present application is not limited in this respect.

At block 202, the client 110 displays a first image portion and a second image portion. According to an embodiment of the present application, the first image portion is rotatable relative to the second image portion, and the first image portion and the second image portion are obtained by cropping an original image and rotating the cropped first image portion with respect to the second image portion. According to an embodiment of the present application, the first image portion and the second image portion may be received by the client 110 from the server 130 via the network 120.

Figure 3:
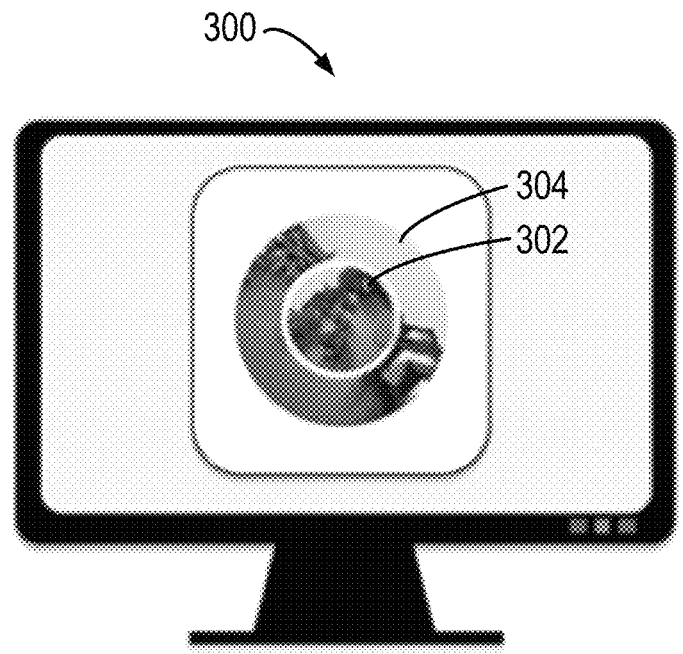
FIG. 3 illustrates a schematic diagram of an example display 300 in accordance with an embodiment of the present application.

FIG. 3 illustrates a schematic diagram of an example display 300 in accordance with an embodiment of the present application. According to the embodiment of the present application, the example display 300 may be a display on the client 110. The example display 300 may include a first image portion 302 and a second image portion 304. For reasons of clarity, in the example display 300, there is a gap between the first image portion 302 and the second image portion 304, but the first image portion 302 and the second image portion 304 may also be tightly fitted without a gap.

As shown in FIG. 3, the first image portion 302 and the second image portion 304 are two portions of a circular original image, wherein, the first image portion 302 is rotatable relative to the second image portion 304. According to some embodiments of the present application, the first image portion 302 is rotatable and the second image portion 304 is stationary. According to further embodiments of the present application, the first image portion 302 is stationary and the second image portion 304 is rotatable. According to some embodiments of the present application, both the first image portion 302 and the second image portion 304 are rotatable.

According to some embodiments of the present application, the original image may be of any shape including square and rectangle, and the first image portion 302 and the second image portion 304 are cropped from the original image. According to further embodiments of the present application, the original image may be circular, with a center circle cropped out of the original image being the first image portion 302 and the remaining portion being the second image portion 304.

According to the embodiment of the present application, a user needs to complete an image verification operation by rotationally aligning the first image portion 302 and the second image portion 304 through an operation such as a touch drag or a mouse drag or the like. In some embodiments, the first image portion 302 and the second image portion 304 may be initially aligned, at this time according to different system settings, the user may be required to perform the image verification by clicking a rotatable portion or rotating the rotatable portion by one revolution so that the first image portion 302 and the second image portion 304 are aligned again.

According to some embodiments of the present application, in a case where the user is required to make the first image portion 302 to be aligned with the second image portion 304 by dragging and rotating the first image portion 302, the second image portion 304 may be displayed in a rotating state or a swinging state, thereby increasing the difficulty of passing verification by aligning the two portions through computer recognition. The rotation or swing of the second image portion 304 may be carried out as per an instruction of the client 110 or the server 130. The scheme of adopting simultaneous rotation of the first image portion 302 and the second image portion 304 may prevent static matching of a computer simulation program, for example, after the computer collects enough verification image inventories by various means, under the condition that the second image portion 304 is stationary, a method applicable to image skeleton pixel matching has a certain verification success probability, thus the scheme of adding the simultaneous rotation of the first image portion 302 and the second image portion 304 can solve, from the source, the attack of static proofreading of a computer by collecting the image inventory.

According to some embodiments of the present application, a gap may be formed between the first image portion 302 and the second image portion 304 in a case where the client 110 displays the first image portion 302 and the second image portion 304. According to some embodiments of the present application, a gap may be formed between the first image portion 302 and the second image portion 304 by scaling at least one of the first image portion 302 and the second image portion 304, and a gap may be formed between the first image portion 302 and the second image portion 304 by at least one of zooming out the first image portion 302 and zooming in the second image portion 304. Forming a gap between the first image portion 302 and the second image portion 304 may be carried out as per an instruction of the client 110 or the server 130.

Figure 4:
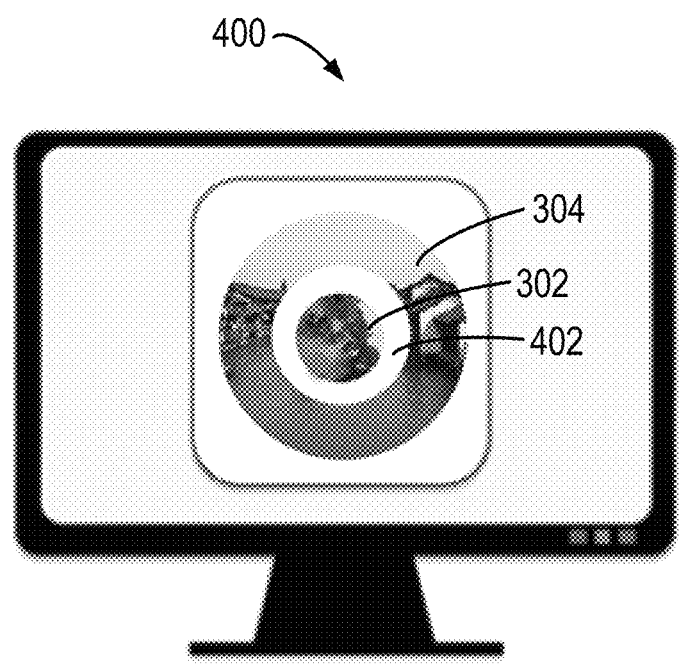
FIG. 4 illustrates a schematic diagram of an example display 400 in accordance with an embodiment of the present application.

FIG. 4 illustrates a schematic diagram of an example display 400 in accordance with an embodiment of the present application. According to the embodiment of the present application, the example display 400 may be a display on the client 110. The example display 400 may include a first image portion 302, a second image portion 304, and a gap 402 in the form of a blank circle formed between the first image portion 302 and the second image portion 304.

By forming the gap 402 in the form of a blank circle between the first image portion 302 and the second image portion 304, this makes it difficult for a computer to pass an image verification by recognizing the pixel continuity of an edge of the image through computer vision, thus the attack in terms of the computer vision can be effectively prevented, and the existence of the gap 402 makes the first image portion 302 and the second image portion 304 not be a complete image any longer, so that the difficulty of computer recognition can be further increased.

Combined adjustment of the width of the gap 402 and the relative rotation speed can simultaneously intercept computer simulation attacks of dynamic computer vision recognition and static library matching with very little disruption to normal users, and because the verification method is novel, it will not make the user resist emotionally or reduce the user experience.

According to some embodiments of the present application, the width of the gap 402 formed between the first image portion 302 and the second image portion 304 may be determined based on a desired difficulty level of image verification. According to further embodiments of the present application, the degree to which at least one of the first image portion 302 and the second image portion 304 is scaled (i.e., the width of the formed gap 402) may be determined based on the desired difficulty level of image verification. The wider the gap 402 is, the larger the difficulty of computer recognition is. The degree to which at least one of the first image portion 302 and the second image portion 304 is scaled may be determined by the client 110 or the server 130.

At block 204, the client 110 receives an operation for rotating the first image portion 302. According to some embodiments of the present application, the operation for rotating the first image portion 302 may be a drag operation, at this time, the client 110 may receive an operation for rotating the first image portion 302 through rotating, by the user, the first image portion 302 by an operation such as a touch drag, a mouse drag or the like. According to further embodiments of the present application, the operation for rotating the first image portion 302 may be a click operation that causes the first image portion 302 to make rotation corresponding to a position on the rotated first image part 302, for example by clicking on the position. Meanwhile, the operation for rotating the first image portion 302 not only may be used to rotate the first image portion 302 clockwise, but also may be used to rotate the first image portion 302 counterclockwise. It is noted that the form of the operation for rotating the first image portion 302 is not limited in the present application.

According to some embodiments of the present application, the client 110 may display an indicating device on the first image portion 302, so that the user can rotate the first image portion 302 by performing an operation such as a touch drag, a mouse drag or the like with respect to the indicating device.

Figure 5:
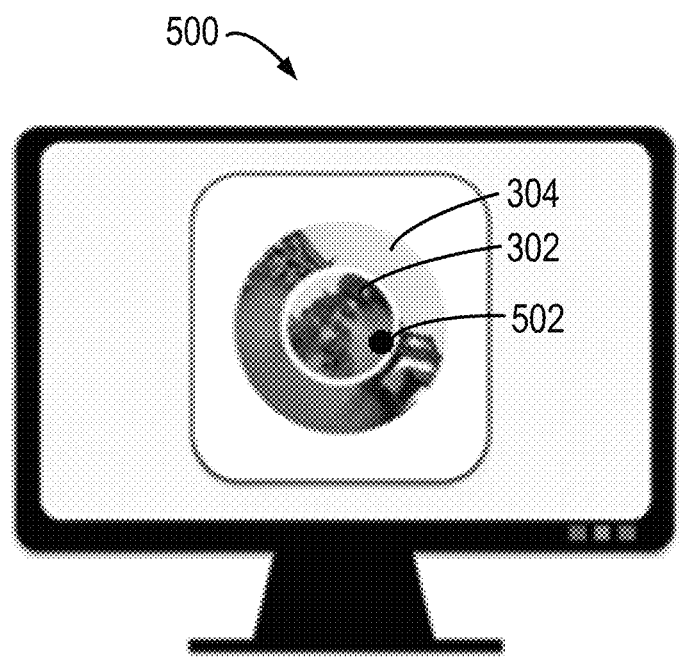
FIG. 5 illustrates a schematic diagram of an example display 500 in accordance with an embodiment of the present application.

FIG. 5 illustrates a schematic diagram of an example display 500 in accordance with an embodiment of the present application. According to the embodiment of the present application, the example display 500 may be a display on the client 110. The example display 500 may include a first image portion 302, a second image portion 304, and an indicating device 502 on the first image portion 302. The user may rotate the first image portion 302 by performing an operation such as a touch drag, a mouse drag or the like with respect to the indicating device 502.

According to further embodiments of the present application, the client 110 may display a preset control on a portion other than the first image portion 302 and the second image portion 304, or on the first image portion 302 or the second image portion 304, so that the user can achieve rotation of the first image portion 302 by manipulating the preset control. Herein, the preset control may be, for example, a slider, a direction button, or a clicking area supporting a corresponding rotation of the first image portion 302 by clicking a specific position thereon, or the like.

At block 206, the client 110 rotates the first image portion 302 based on the received operation. According to some embodiments of the present application, the client 110 may synchronously rotate the first image portion 302 based on the received operation. According to further embodiments of the present application, the client 110 may jump to rotate the first image portion 302 based on the received operation of directly clicking on a certain position.

At block 208, the client 110, in response to that the operation is ended, determines whether the angle of the first image portion 302 relative to the second image portion 304 matches with the original image, i.e., whether the rotated first image portion 302 is aligned with the second image portion 304.

According to some embodiments of the present application, in a case where the angle of the rotated first image portion 302 relative to the second image portion 304 is smaller than a certain predetermined threshold, e.g., 3 degrees, it can be regarded that the angle of the first image portion 302 relative to the second image portion 304 matches with the original image. Herein, the client 110 may parameterize the performed operation and the angle of the rotated first image portion 302 relative to the second image portion 304, and determine that the matching condition may also be parameterized, thereby facilitating determination of whether the angle of the first image portion 302 relative to the second image portion 304 matches with the original image.

According to some embodiments of the present application, the client 110 may send the determined angle of the first image portion 302 relative to the second image portion 304 to the server 130 through the network 120, so that the server 130 determines whether the angle matches with the original image. Then, the client 110 may receive, from the server, information indicating whether the angle matches with the original image.

Figure 6:
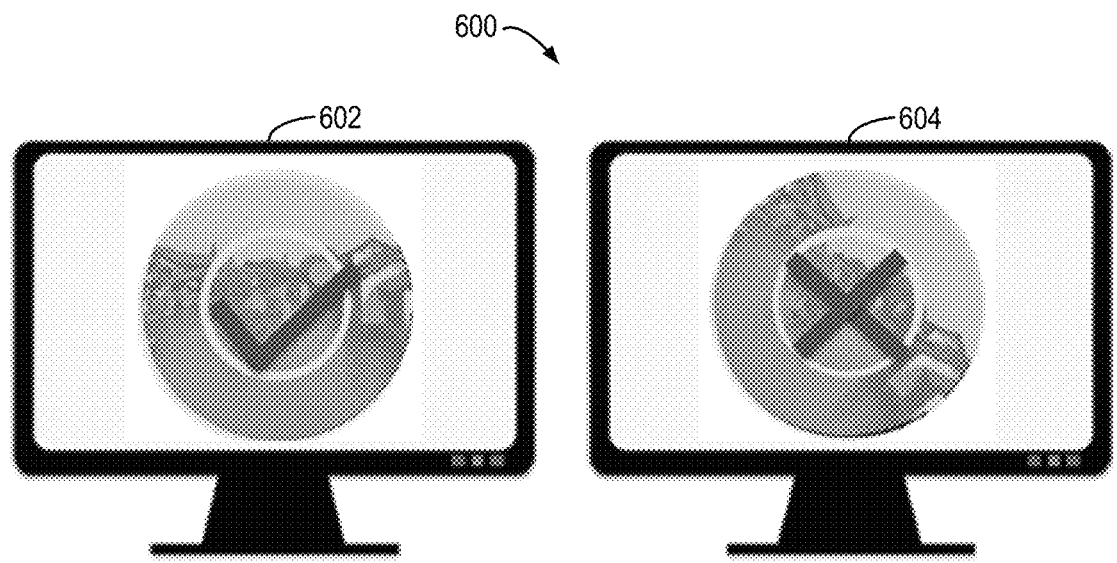
FIG. 6 illustrates a schematic diagram of an example display 600 in accordance with an embodiment of the present application.

FIG. 6 illustrates a schematic diagram of an example display 600 in accordance with an embodiment of the present application. According to the embodiment of the present application, the example display 600 may be a display on the client 110. The example display 500 may include a first display 602 and a second display 604. In a case where it is determined at block 208 that the angle of the first image portion 302 relative to the second image portion 304 matches with the original image, the client 110 displays the first display 602, thus indicating matching. In a case where it is determined at block 208 that the angle of the first image portion 302 relative to the second image portion 304 does not match with the original image, the client 110 displays the second display 604, thus indicating mismatching.

According to some embodiments of the present application, in a case where it is determined by the client 110 itself whether the angle of the first image portion 302 relative to the second image portion 304 matches with the original image, the client 110 may display the first display 602 or the second display 604 directly according to the determination result.

Using the technology according to the present application, a user can complete an image verification by a simple dragging interaction. The use of two image portions which are rotatable relatively or even have a gap therebetween can increase the difficulties of semantic understanding and visual recognition of a computer without affecting the identification of a human user, and can achieve an effective interception of computer attacks, so that it is difficult to pass an image verification, even if an attacker obtains a large amount of verification code material by various means, to train a computer vision model.

Figure 7:
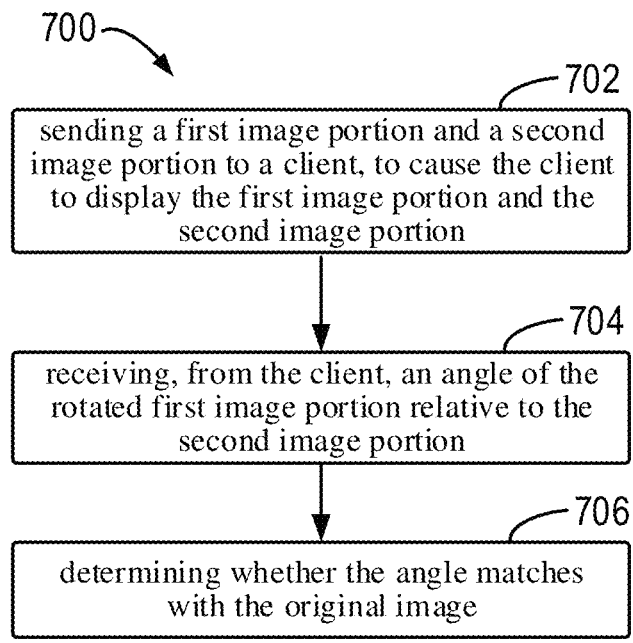
FIG. 7 illustrates a flowchart of an image verification method 700 in accordance with an embodiment of the present application.

FIG. 7 illustrates a flowchart of an image verification method 700 in accordance with an embodiment of the present application. Specifically, the image verification method 700 may be performed by the image verification system 100. It should be understood that the image verification method 700 may also include an additional operation not shown and/or may omit an illustrated operation, and the scope of the present application is not limited in this respect.

At block 702, the server 130 sends the first image portion 302 and the second image portion 304 to the client 110 via the network 120, such that the client 110 displays the first image portion 302 and the second image portion 304. According to an embodiment of the present application, the first image portion 302 is rotatable relative to the second image portion 304, and the first image portion 302 and the second image portion 304 are obtained by cropping the original image and rotating the cropped first image portion 302 with respect to the second image portion 304. According to some embodiments of the present application, the original image can be of any shape including square and rectangle, and the first image portion 302 and the second image portion 304 are cropped from the original image. According to further embodiments of the present application, the original image may be circular, with a center circle cropped out of the original image being the first image portion 302 and the remaining portion being the second image portion 304. The operation described in the block 702 corresponds to that described above with reference to the block 202, and will not be repeated here.

At block 704, the server 130 receives the angle of the rotated first image portion 302 relative to the second image portion 304 from the client 110 via the network 120. The operation described in the block 704 corresponds to that described above with reference to the block 208, and will not be repeated here.

At block 706, the server 130 determines whether the angle of the rotated first image portion 302 relative to the second image portion 304 matches with the original image, i.e., whether the rotated first image portion 302 is aligned with the second image portion 304. The operation described in the block 706 corresponds to that described above with reference to the block 208, and will not be repeated here. According to the embodiment of the present application, in a case where the server 130 determines that the angle of the rotated first image portion 302 relative to the second image portion 304 matches with the original image, information indicating that the angle of the rotated first image portion 302 relative to the second image portion 304 matches with the original image may be sent to the client 110 via the network 120, as described with reference to the block 206 and FIG. 6.

Figure 8:
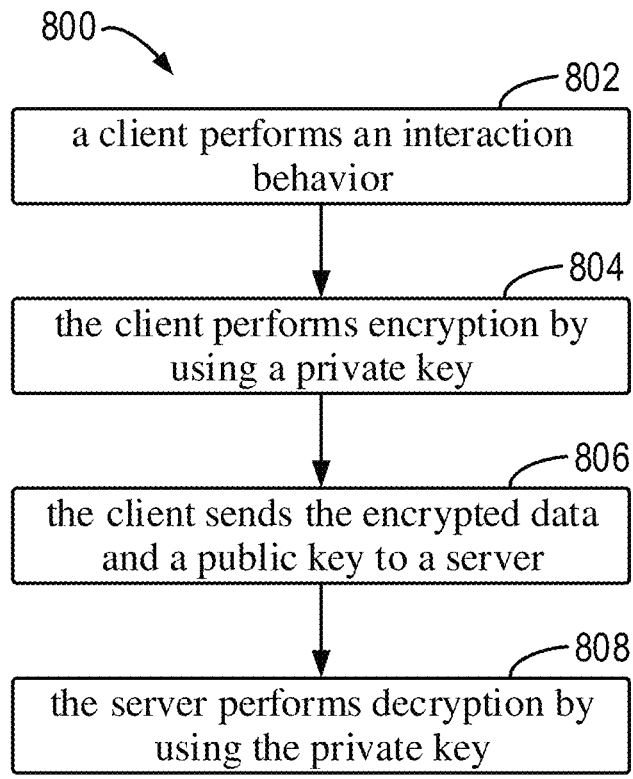
FIG. 8 illustrates a flowchart of an information encryption process 800 in accordance with an embodiment of the present application.

FIG. 8 illustrates a flowchart of an information encryption process 800 in accordance with an embodiment of the present application. Specifically, the information encryption process 800 may be performed by the image verification system 100.

In the information encryption process 800, the client 110 and the server 130 initially agree on a private key, and agree to employ, for example, an advanced encryption standard (AES). At block 802, the client 110 interacts with the user, and generates corresponding data, e.g., parameters.

At block 804, the client 110 encrypts the generated data by using the private key, to obtain encrypted data.

At block 806, the client 110 sends the encrypted data and a public key to the server 130.

At block 808, the server decrypts the received encrypted data by using the private key.

By adopting the information encryption process 800, all data transfer processes between the client 110 and the server 130 use encrypted transmission, so that it is possible to prevent a computer attacker from intercepting a security verification result from the data transfer process, and thus the security of operation of the image verification system 100 itself is ensured.

Figure 9:
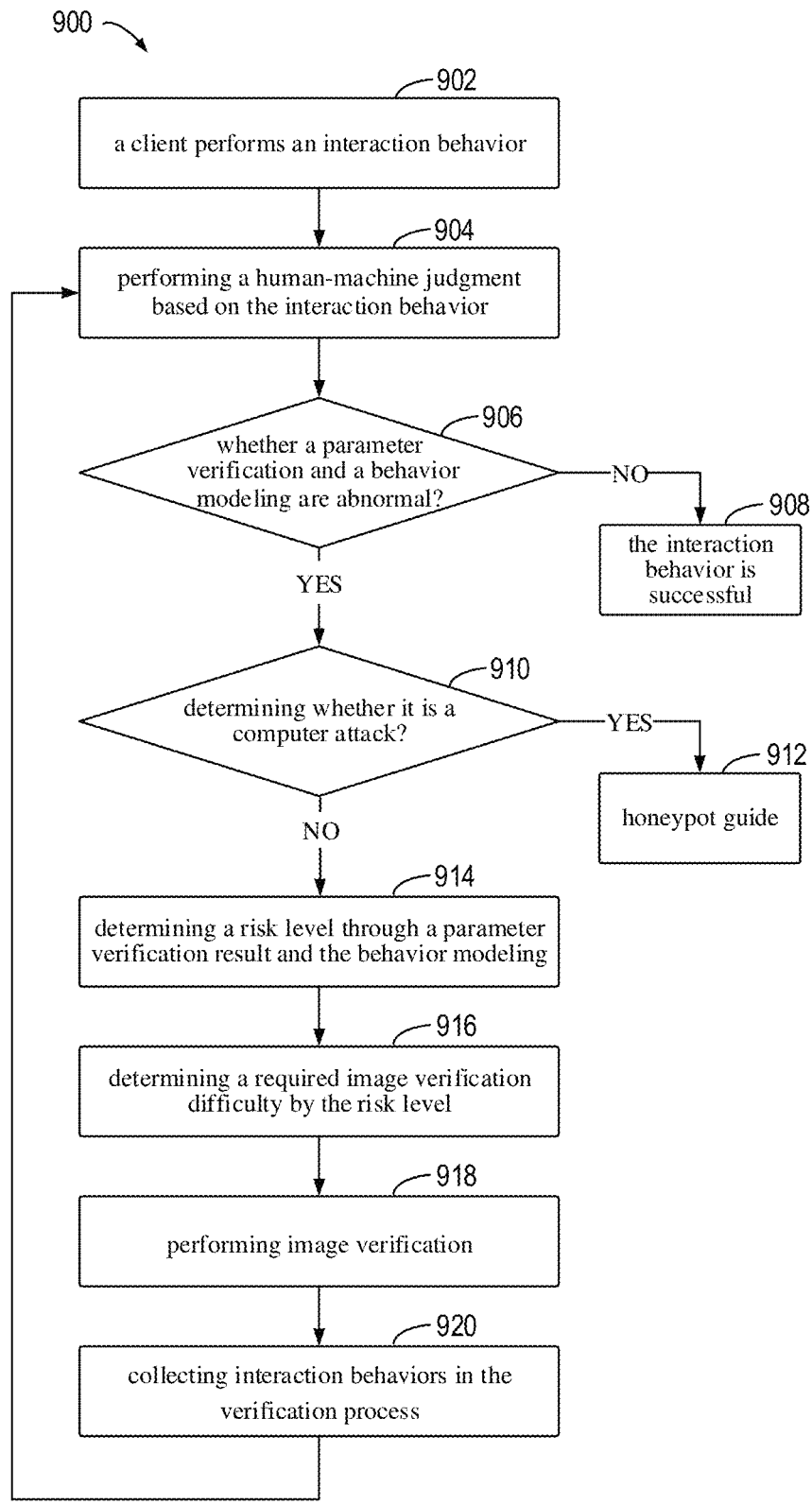
FIG. 9 illustrates a flowchart of an image verification method 900 according to an embodiment of the present application.

FIG. 9 illustrates a flowchart of an image verification method 900 in accordance with an embodiment of the present application. Specifically, the image verification method 900 may be performed by the image verification system 100.

At block 902, the client 110 interacts with a user. According to an embodiment of the present application, the user performs a business operation requiring verification, such as registration, login and the like, through the client 110, and at this time, the client 100 may collect user behavior data.

At block 904, a human-machine judgment, such as a parameter verification, a behavior modeling and the like, may be performed by the client 110 or the server 130 based on the user interaction behavior.

At block 906, the client 110 or the server 130 determines whether the parameter verification and the behavior modeling are abnormal. If there is no abnormality, it proceeds to block 908; otherwise, it proceeds to block 910.

At the block 908, the business operation performed by the user is successful, and the user can complete the business operation without being aware of it.

At the block 910, the client 110 or the server 130 further determines whether the operation behavior is a computer attack. If the operation behavior is a computer attack, it proceeds to block 912; otherwise, it proceeds to block 914.

At the block 912, the client 110 or the server 130 may guide a computer attacker into a spoofing operation page (e.g., a honeypot page), giving the computer attacker the illusion that the attack passes, and thus it is possible to further collect relevant information about the computer attacker.

At the block 914, the client 110 or the server 130 may determine a risk level through the parameter verification result and the behavior modeling.

At block 916, the client 110 or the server 130 may determine a desired difficulty of image verification by the risk level, and in turn determine the first image portion 302 and the second image portion 304 to be used for the image verification.

At block 918, the client 110 or the server 130 performs image verification. The process of performing the image verification is similar to that described above with reference to FIGS. 1 to 8, and will not be repeated here.

At block 920, the client 110 or the server 130 collects interaction behaviors in the verification process and feeds the interaction behaviors back to the block 904, and aggregates previous user business operation behavior for human-machine judgment, and repeats in this way, until the user business operation is successful or it proceeds to a spoofing operation page.

Figure 10:
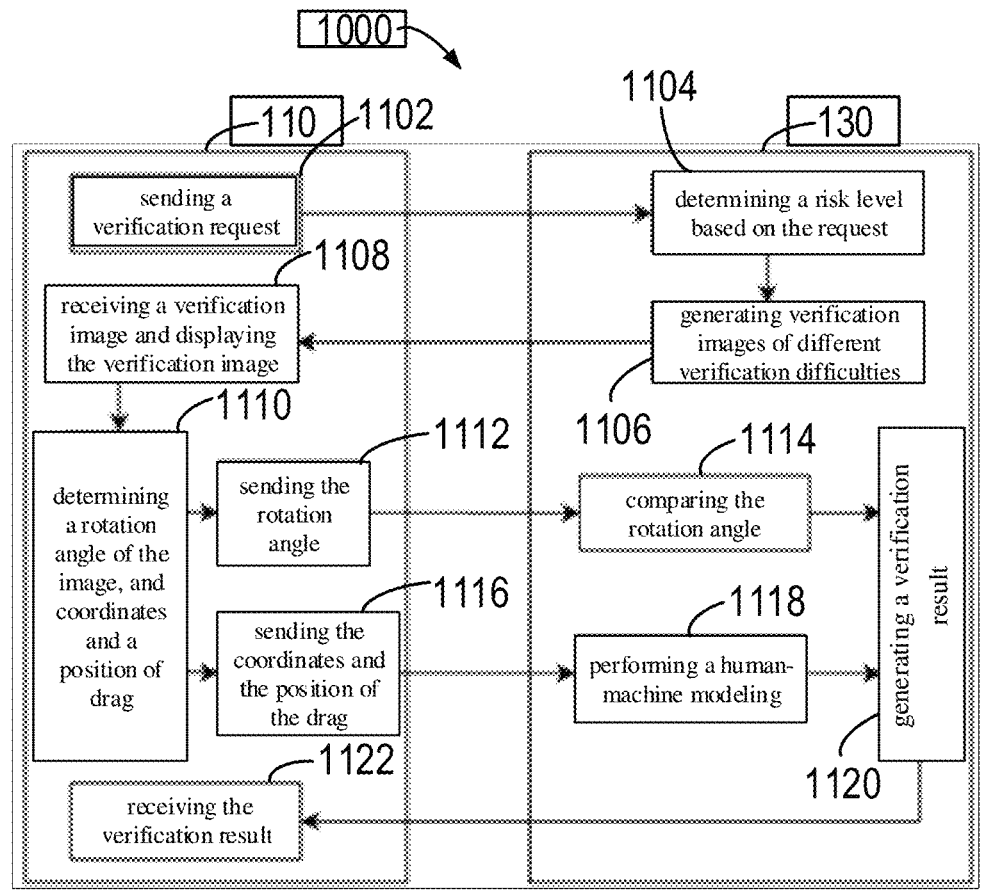
FIG. 10 illustrates a schematic diagram of an interaction process 1000 of a client and a server in accordance with an embodiment of the present application.

FIG. 10 illustrates a schematic diagram of an interaction process 1000 of a client and a server in accordance with an embodiment of the present application. Specifically, the image verification method 900 may be performed by the image verification system 100, wherein, operations on the left side of FIG. 10 are executed by the client 110, and operations on the right side are executed by the server 130.

At block 1002, after collecting a user interaction behavior, the client 110 aggregates a relevant parameter, and sends an image verification request to the server 130.

At block 1004, the server 130 determines a risk level, e.g., using a human-machine recognition system, based on the image verification request.

At block 1006, the server 130 generates verification images of different verification difficulties according to the risk level.

At block 1108, the client 110 receives a verification image (i.e., the first image portion 302 and the second image portion 304) from the server 130, and displays the verification image.

At block 1110, the client 110 determines an angle of the rotated first image portion 302 relative to the second image portion 304, and coordinates and a position of the operation, through the operation performed by the user.

At block 1112, the client 110 sends the angle of the rotated first image portion 302 relative to the second image portion 304 to the server 130.

At block 1114, the server 130 compares the rotation angle, to determine whether the first image portion 302 and the second image portion 304 are aligned.

At block 1116, the client 110 sends the coordinates and the position of the operation to the server 130.

At block 1118, the server 130 utilizes a human-machine modeling to recognize whether the coordinates and the position of the operation are abnormal. According to the embodiment of the present application, whether the coordinates and the position of the operation are abnormal may include the position at which a contact point is operated each time, the trajectory of the contact point, and whether the operation is performed at a uniform speed, which thus can be used to determine whether the operation is performed by a human user or by a computer attacker.

At block 1120, the server 130 may generate a verification result of a successful verification or a failed verification, based on determining whether the angle is correct and whether the coordinates and the position of the operation are abnormal at the block 1114 or the block 1118.

According to the embodiment of the present application, in a case where the server 130 determines at the block 1114 or the block 1118 that the angle is wrong or the coordinates and the position of the operation are abnormal, the sever 130 may re-generate an image of corresponding verification difficulty to perform verification again, or to guide the computer attacker into a spoofing operation page (e.g., a honeypot page).

At block 1122, the client 110 receives a verification result from the server 130.

Figure 11:
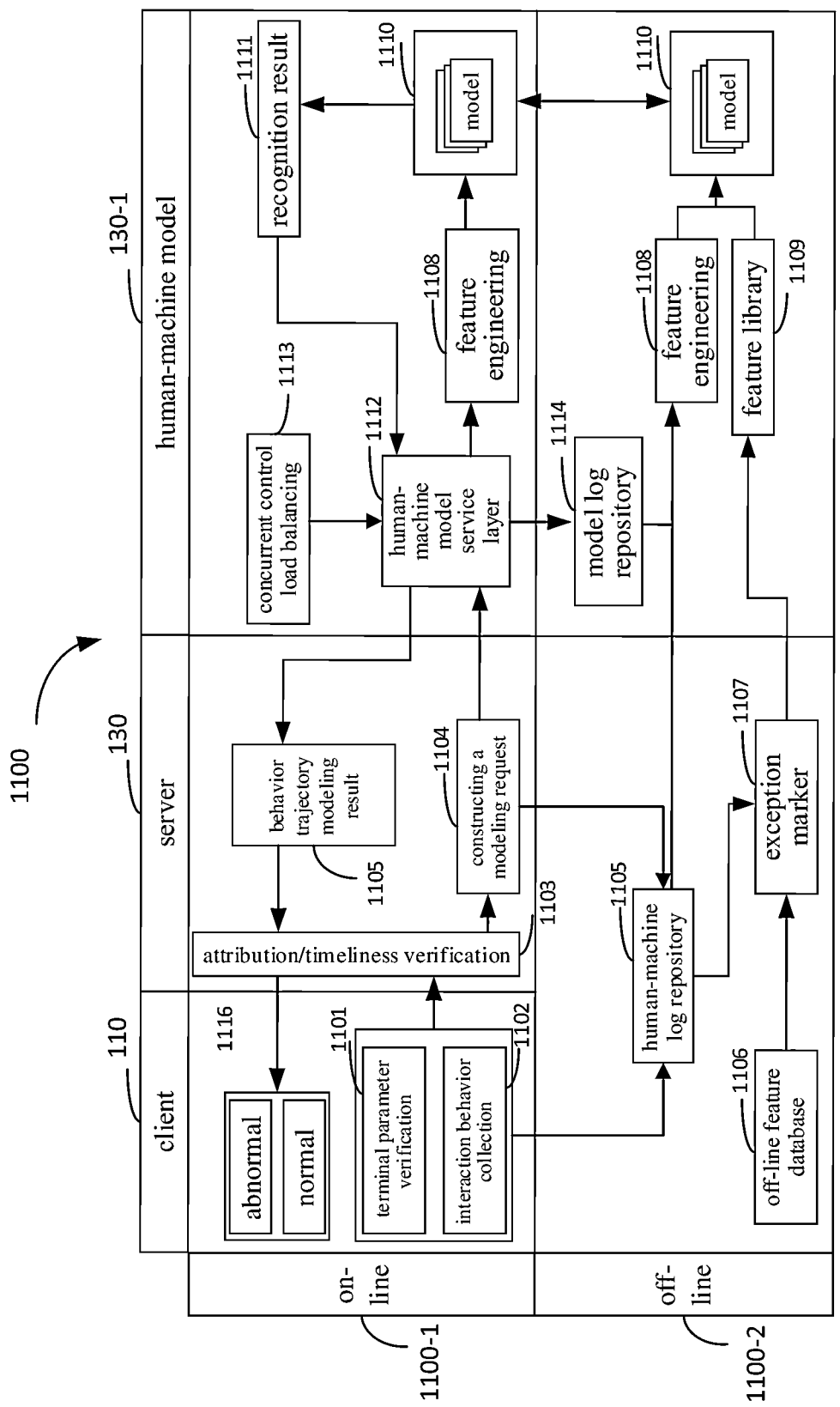
FIG. 11 illustrates a schematic diagram of an interaction process 1100 of a client, a server and a human-machine model in accordance with an embodiment of the present application.

FIG. 11 illustrates a schematic diagram of an interaction process 1100 of a client 110, a server 130 and a human-machine model 130-1 in accordance with an embodiment of the present application. According to the embodiment of the present application, the human-machine model 130-1 may be considered to be a lower level module of the server 130, and may also be considered to be a part of the server 130. An input of the human-machine model 130-1 may be a feature of a interaction behavior, and an output of the human-machine model 130-1 may be a probability that the interaction behavior is risky.

According to the embodiment of the present application, the interaction process 1100 may include an on-line processing process and an off-line processing process. Herein, the off-line processing process indicates that the processing process is not directed to one-time login behavior, but may be directed to all login behaviors within a time period, e.g., several hours.

At block 1101 and block 1102, in a case where the user uses the client 110 for a human-computer interaction to generate behavior data, the client 110 performs parameter verification and collection of interaction behavior coordinates, and sends the data to the server 130.

At block 1103, the server 130 may perform further verification of parameters, such as attribution verification, timeliness check, uniqueness check, validity check and the like, and in a case where the verification fails, an abnormal result is returned directly. In a case where the verification is normal, it proceeds to block 1104.

At the block 1104, the server 130 structurizes the behavior data and constructs a human-machine model service layer request.

At block 1105, the client 110 builds a human-machine log repository based on the parameter verification and interaction behavior coordinates collected at the blocks 1101 and 1102 as well as the constructed model request at the block 1104.

At block 1106, the client 110 acquires an additional off-line feature database, which is a historical database storing information used to mark an abnormal behavior.

At block 1107, the client 110 utilizes the human-machine log repository and the off-line feature database to recognize an exception request by data mining (for example, judging whether there is abnormality (such as a batch operation behavior) by the human-machine log repository itself), mark the abnormal behavior and obtain a human-machine recognition abnormal feature library.

At block 1109, the human-machine recognition abnormal feature library is provided to the human-machine model 130-1.

At block 1112, a human-machine model service layer in the human-machine model 130-1 receives a parameter request, and calculates feature engineering that is unified with the off-line.

According to the embodiment of the present application, the requested data of the human-machine model service layer in the human-machine model 130-1 may fall into a model log repository, as shown in the block 1114. According to the embodiment of the present application, the model log repository refers to a log generated by an action of calling a model after the model is established, such as data for model-based operations, and the model log repository comes from the human-machine model 130-1 of the on-line section. Therefore, in a case where the model has not been established, the model log repository does not need to be considered for the time being.

Then, the human-machine model 130-1 may integrate the human-machine log repository and the model log repository to calculate human-machine off-line feature engineering which is unified with on-line feature engineering, as shown in the block 1108.

The human-machine model 130-1 is learned and modeled based on the feature library and the feature engineering, for example, using an open source deep learning framework, as shown in the block 1110.

According to the embodiment of the present application, the feature engineering and model are used in both off-line and on-line phases, and are therefore shown in the form of double arrows in the off-line phase and the on-line phase of the human-machine model 130-1, respectively.

At block 1111, the human-machine model 130-1 utilizes the obtained parameters to call corresponding model files, obtain a recognition result, and return the recognition result to the human-machine model service layer.

The human-machine model service layer improves the modeling result based on control such as the concurrent control load balancing or the like shown in the block 1113.

At block 1115, the server 130 receives the behavior trajectory modeling result, and finally returns a normal or abnormal behavior result to the client 110, in combination with further verification of the parameters as shown in the block 1103.

Therefore, with the interaction process 1100 of the client 110, the server 130 and the human-machine model 130-1 shown in FIG. 11, a judgment result of the input user interaction behavior can be obtained, and modeling a behavior of user interaction operation and presenting a verification image of what degree of difficulty can, in turn, depend on the result of human-machine recognition. Meanwhile, the interaction process 1100 has very good availability in terms of stability, fault tolerance, extendibility, complexity and timeliness, which is sufficient to cope with large-scale computer simulation attacks.

According to an example embodiment of the present application, an image including an original image and the first image portion 302 and the second image portion 304 that are generated after being cropped may be referred to as a material. Thus, the embodiment of the present application may further include generating different types of images according to an on-line request, and managing the usage status of the images. The process of image processing may include, for example, obtaining a large amount of authorized materials, performing cropping processing on the images by using an automated program, as well as performing different levels of scaling, rotation and combination on the cropped images in order to meet different verification difficulty requirements, while parameterizing the operations, and storing the parameters into a material parameter database for use in the image verification.

According to an example embodiment of the present application, a piece of material may go through five different stages: (1) off-line raw material, which means original material before being cropped; (2) processed material, which means material after being cropped, scaled, rotated and combined; (3) material waiting for going on line, which means material selected from the processed material to be available for on-line use; (4) on-line material, which means verification material being used in various business scenarios, and can be configured independently depending on the business scenarios; and (5) off-line material, which means material which goes off line from on-line use, for subsequent reuse.

Hereinabove, the image verification system 100 in which image verification methods in some exemplary embodiments of the present application may be implemented, the image verification methods 200, 700, and 900 according to the embodiments of the present application, the example displays 300, 400, 500, and 600 according to the embodiments of the present application, the image verification method 700 according to the embodiment of the present application, the information encryption process 800 according to the embodiment of the present application, and related contents of the interaction process 1000 of a client and a server according to the embodiment of the present application, as well as the interaction process 1100 of a client, a server and a human-machine model according to the embodiment of the present application, have been described with reference to FIGS. 1 to 11. It is to be understood that the foregoing descriptions are intended to better illustrate what are recited in the present application, and are not intended to be limiting in any way.

It is to be understood that the numbers of respective elements and the magnitudes of respective physical quantities employed in the respective figures of the present application are merely exemplary, and are not intended to limit the protection scope of the present application. The above number and magnitudes may be arbitrarily set as needed, without affecting the normal implementation of the embodiments of the present application.

The details of the image verification methods according to the embodiments of the present application have been described above with reference to FIGS. 1 to 11. Hereinafter, respective modules of the image verification apparatus will be described with reference to FIGS. 12 and 13.

Figure 12:
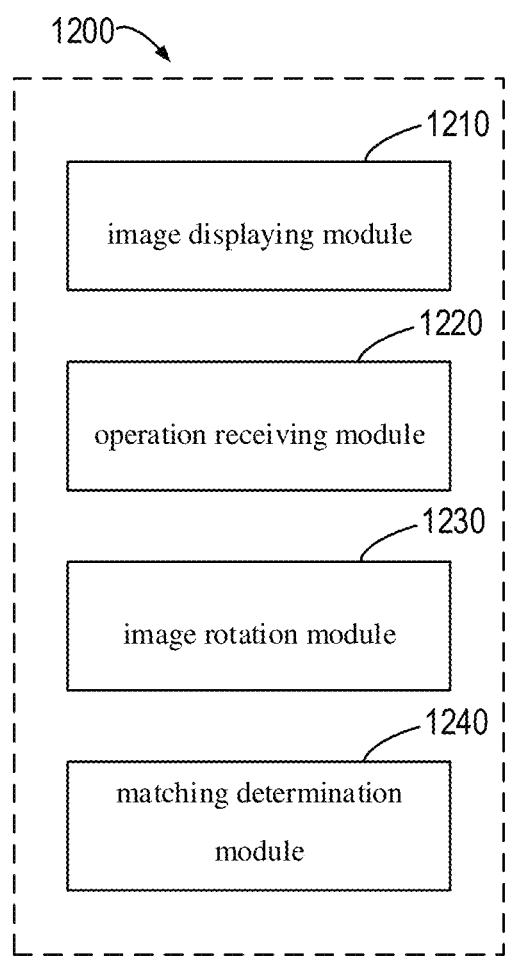
FIG. 12 illustrates a schematic block diagram of an image verification apparatus 1200 in accordance with an embodiment of the present application.

FIG. 12 a schematic block diagram of an image verification apparatus 1200 in accordance with an embodiment of the present application. As shown in FIG. 3, the image verification apparatus 1200 may include: an image displaying module 1210 configured for displaying a first image portion and a second image portion, the first image portion being rotatable with respect to the second image portion, the first image portion and the second image portion being obtained by cropping an original image and rotating the cropped first image portion with respect to the second image portion; an operation receiving module 1220 configured for receiving an operation for rotating the first image portion; an image rotation module 1230 configured for rotating the first image portion based on the operation; and a matching determination module 1240 configured for determining whether an angle of the first image portion relative to the second image portion matches with the original image, in response to determining that the operation is ended.

In some embodiments, the first image portion may be a portion cropped from the original image and the second image portion may be a remaining portion of the original image.

In some embodiments, the image displaying module 1210 may include a first image displaying module (not shown) configured for displaying the second image portion in a rotating state or a swinging state.

In some embodiments, the image displaying module 1210 may include a gap forming module (not shown) configured for forming a gap between the first image portion and the second image portion.

In some embodiments, the gap forming module may include an image scaling module (not shown) configured for scaling at least one of the first image portion and the second image portion.

In some embodiments, the gap forming module may include a gap width determination module (not shown) configured for determining a width of the gap formed between the first image portion and the second image portion, based on a desired difficulty level of image verification.

In some embodiments, the image verification apparatus 1200 may further include an indicating device displaying module (not shown) configured for displaying an indicating device on the first image portion, and the operation receiving module 1220 may include a first operation receiving module (not shown) configured for receiving the operation through the indicating device.

In some embodiments, the image verification apparatus 1200 may further include a preset control displaying module (not shown) configured for displaying a preset control, and the operation receiving module 1220 may include a second operation receiving module (not shown) configured for receiving the operation through the preset control.

In some embodiment, the matching determination module 1240 may include a first matching determination module (not shown) configured for sending the angle to a server, to cause the server to determine whether the angle matches with the original image.

In some embodiments, the image verification apparatus 1200 may further include a matching information receiving module (not shown) configured for receiving, from the server, information indicating whether the angle matches with the original image.

In some embodiments, the image verification apparatus 1200 may further include an image receiving module (not shown) configured for receiving the first image portion and the second image portion from a server.

Figure 13:
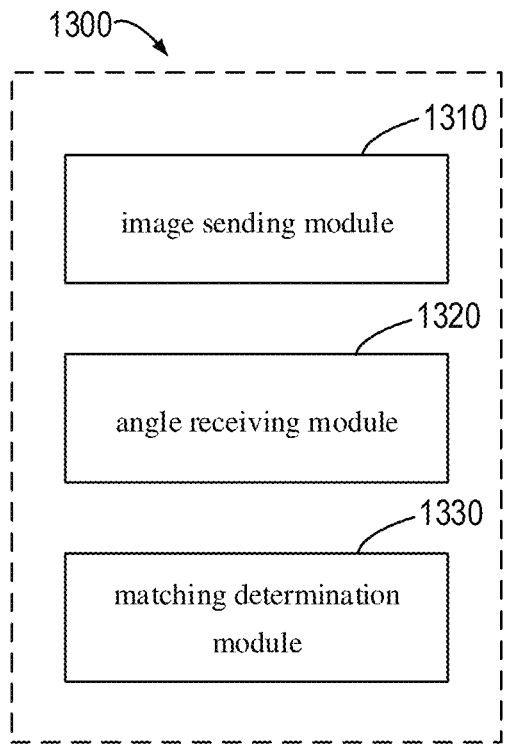
FIG. 13 illustrates a schematic block diagram of an image verification apparatus 1300 in accordance with an embodiment of the present application.

FIG. 13 a schematic block diagram of an image verification apparatus 1300 in accordance with an embodiment of the present application. As shown in FIG. 13, the image verification apparatus 1300 may include: an image sending module 1310 configured for sending a first image portion and a second image portion to a client, to cause the client to display the first image portion and the second image portion, the first image portion being rotatable with respect to the second image portion, the first image portion and the second image portion being obtained by cropping an original image and rotating the cropped first image portion with respect to the second image portion; an angle receiving module 1320 configured for receiving, from the client, an angle of the rotated first image portion relative to the second image portion; and a second matching determination module 1330 configured for determining whether the angle matches with the original image.

In some embodiments, the first image portion may be a portion cropped from the original image and the second image portion may be a remaining portion of the original image.

In some embodiments, the image verification apparatus 1300 may further include a matching information sending module (not shown) configured for sending, to the client, information indicating whether the angle matches with the original image.

According to embodiments of the present application, the present application further provides an electronic device and a computer-readable storage medium.

Through the descriptions above with reference to FIGS. 1 to 13, the technical solutions according to the embodiment of the present application have many advantages as compared with traditional solutions. For example, with the above technical solutions, use of two image portions which are relatively rotatable or even have a gap therebetween increases the difficulty of computer simulation attacks in both semantic understanding and computer vision recognition, and in combination with the human-machine recognition system proposed by the present application, recognition of a normal user and a computer simulation attack can be realized effectively. Specifically, (1) the image verification method itself proposed by the present application does not provide specific semanteme, such as clicking an image, sliding to a certain position, rotating an angle and the like, and instead, the verification result is determined by automatic proofreading of the first image portion and the second image portion, which thus causes high difficulty of computer attack but little difficulty in understanding for a normal user; (2) a gap in the form of a blank circle between the first image portion and the second image portion, makes it difficult for a computer to pass the image verification by recognizing the pixel continuity of the edge of the image, thus the attack in terms of the computer vision can be effectively prevented, and the existence of the gap makes the first image portion and the second image portion not be a complete image any longer, so that the difficulty of computer recognition can be further increased; and (3) the present application provides a behavior recognition method based on machine learning for the image verification method using the above described technical solution, and provides a systematized solution.

Figure 14:
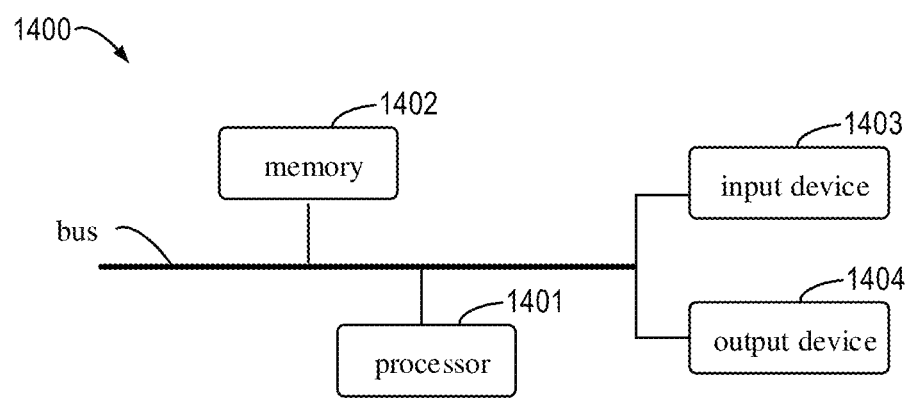
FIG. 14 illustrates a schematic block diagram of an electronic device 1400 in accordance with an embodiment of the present application.

FIG. 14 illustrates a schematic block diagram of an electronic device 1400 in accordance with an embodiment of the present application. For example, the client 110 as shown in FIG. 1, the image verification apparatus 1200 as shown FIG. 12, and the image verification apparatus 1300 as shown by FIG. 13 may be implemented by the electronic device 1400. The electronic device 1400 is intended to represent various forms of digital computers, such as laptop computers, desktop computers, workstations, personal digital assistants, servers, blade servers, mainframe computers, and other suitable computers. The electronic device 1400 may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 14, the electronic device 1400 may include one or more processors 1401, a memory 1402, and interfaces for connecting the respective components, including high-speed interfaces and low-speed interfaces. The respective components are interconnected by different buses and may be mounted on a common main-board or otherwise as desired. The processor may process instructions executed within the electronic device 1400, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices 1400 may be connected, each providing some of the necessary operations (e.g., as an array of servers, a set of blade servers, or a multiprocessor system). An example of a processor 1401 is shown in FIG. 14.

The memory 1402 is a non-transitory computer-readable storage medium provided herein. The memory stores instructions executable by at least one processor to enable the at least one processor to implement the image verification methods 200, 700 and 900 provided in the present application. The non-transitory computer-readable storage medium of the present application stores computer instructions for enabling a computer to implement the image verification methods 200, 700 and 900 provided in the present application.

The memory 1402, as a non-transitory computer-readable storage medium, may be configured to store non-transitory software programs, non-transitory computer-executable programs, and modules, such as program instructions/modules corresponding to the image verification methods 200, 700 and 900 in the embodiments of the present application (e.g., the image displaying module 1210, the operation receiving module 1220, the image rotation module 1230 and the matching determination module 1240 that are shown in FIG. 12, and the image sending module 1310, the angle receiving module 1320 and the matching determination module 1330 that are shown in FIG. 13). The processor 1401 executes various functional applications and data processing of the electronic device by running the non-transitory software programs, instructions and modules stored in the memory 1402, that is, implements the image verification methods 200, 700 and 900 in the foregoing method embodiment.

The memory 1402 may include a program storage area and a data storage area, wherein the program storage area may store an operating system, and an application program required for at least one function; and the data storage area may store data created according to the use of the electronic device 1400, etc. In addition, the memory 1402 may include a high speed random access memory, and may also include a non-transitory memory, such as at least one disk storage device, a flash memory device, or other non-transitory solid state memory device. In some embodiments, the memory 1402 may optionally include a memory remotely located with respect to the processor 1401, which may be connected, via a network, to the electronic device 1400. Examples of such networks may include, but are not limited to, the Internet, an intranet, a local area network, a mobile communication network and combinations thereof.

The electronic device 1400 may further include an input device 1403 and an output device 1404. The processor 1401, the memory 1402, the input device 1403, and the output device 1404 may be connected by a bus or other means, exemplified by a bus connection in FIG. 14.

The input device 1403 may receive input numeric or character information, and generate a key signal input related to a user setting and a functional control of an electronic device 1400. For example, the input device may be a touch screen, a keypad, a mouse, a track pad, a touch pad, a pointer stick, one or more mouse buttons, a track ball, a joystick, and other input devices. The output device 1404 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

According to the technical solutions of the embodiments of the present application, in a case where an instruction sequence including memory instructions and non-memory instructions is executed sequentially and hazardous conflicts between adjacent memory instructions are going to happen, cooperation between hardware and software is made possible, to continue execution of a large number of non-memory instructions between the two memory instructions having the hazardous conflicts. Therefore, the overall performance (e.g., processing speed and instruction executing efficiency) of the processor can be improved while ensuring programming correctness and usability, the efficiency of executing instructions by using a processor by a user and the user experience are accordingly improved, and the popularization of the artificial intelligence processor can be facilitated.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. An image verification method, comprising:
    displaying a first image portion and a second image portion, the first image portion being rotatable with respect to the second image portion, the first image portion and the second image portion being obtained by cropping an original image and rotating the cropped first image portion with respect to the second image portion;
    receiving an operation for rotating the first image portion;
    rotating the first image portion based on the operation; and
    determining whether an angle of the first image portion relative to the second image portion matches with the original image, in response to determining that the operation is ended,
    wherein, the displaying the first image portion and the second image portion comprises: displaying the second image portion in a rotating state or a swinging state, and forming a gap between the first image portion and the second image portion,
    wherein, forming the gap between the first image portion and the second image portion comprises:
    determining a width of the gap formed between the first image portion and the second image portion, based on a desired difficulty level of image verification, and
    wherein, the first image portion is located within the second image portion.

2. The image verification method according to claim 1, wherein, the first image portion is a portion cropped from the original image and the second image portion is a remaining portion of the original image.

3. The image verification method according to claim 1, wherein, forming the gap between the first image portion and the second image portion comprises:
    scaling at least one of the first image portion and the second image portion.

4. The image verification method according to claim 1, further comprising at least one of:
    displaying an indicating device on the first image portion, and the receiving the operation comprises: receiving the operation through the indicating device,
    displaying a preset control, and the receiving the operation comprises: receiving the operation through the preset control, and
    receiving the first image portion and the second image portion from a server.

5. The image verification method according to claim 1, wherein, determining whether the angle matches with the original image, comprises: sending the angle to a server, to cause the server to determine whether the angle matches with the original image.

6. The image verification method according to claim 5, further comprising:
    receiving, from the server, information indicating whether the angle matches with the original image.

7. A non-transitory computer-readable storage medium storing computer instructions, wherein the computer instructions cause a computer to perform the image verification method according to claim 1.

8. An image verification method, comprising:
    sending a first image portion and a second image portion to a client, to cause the client to display the first image portion and the second image portion, the first image portion being rotatable with respect to the second image portion, the first image portion and the second image portion being obtained by cropping an original image and rotating the cropped first image portion with respect to the second image portion;
    receiving, from the client, an angle of the rotated first image portion relative to the second image portion; and
    determining whether the angle matches with the original image,
    wherein, the second image portion is displayed in a rotating state or a swinging state at the client, and a gap is formed between the first image portion and the second image portion,
    wherein, a width of the gap formed between the first image portion and the second image portion is determined based on a desired difficulty level of image verification, and
    wherein, the first image portion is located within the second image portion.

9. The image verification method according to claim 8, wherein, the first image portion is a portion cropped from the original image and the second image portion is a remaining portion of the original image, and/or
further comprising: sending, to the client, information indicating whether the angle matches with the original image.

10. An image verification apparatus, comprising:
a processor and a memory for storing one or more computer programs executable by the processor,
wherein when executing at least one of the computer programs, the processor is configured to perform the image verification method according to claim 8.

11. The image verification apparatus according to claim 10, wherein, the first image portion is a portion cropped from the original image and the second image portion is a remaining portion of the original image, and/or
wherein when executing at least one of the computer programs, the processor is further configured to send, to the client, information indicating whether the angle matches with the original image.

12. A non-transitory computer-readable storage medium storing computer instructions, wherein the computer instructions cause a computer to perform the image verification method according to claim 8.

13. An image verification apparatus, comprising:
a processor and a memory for storing one or more computer programs executable by the processor,
wherein when executing at least one of the computer programs, the processor is configured to perform operations comprising:
displaying a first image portion and a second image portion, the first image portion being rotatable with respect to the second image portion, the first image portion and the second image portion being obtained by cropping an original image and rotating the cropped first image portion with respect to the second image portion;
receiving an operation for rotating the first image portion;
rotating the first image portion based on the operation; and
determining whether an angle of the first image portion relative to the second image portion matches with the original image, in response to determining that the operation is ended,
wherein, when executing at least one of the computer programs, the processor is configured to further perform operations comprising: displaying the second image portion in a rotating state or a swinging state, and forming a gap between the first image portion and the second image portion,
wherein, forming the gap between the first image portion and the second image portion comprises:
determining a width of the gap formed between the first image portion and the second image portion, based on a desired difficulty level of image verification, and
wherein, the first image portion is located within the second image portion.

14. The image verification apparatus according to claim 13, wherein, the first image portion is a portion cropped from the original image and the second image portion is a remaining portion of the original image.

15. The image verification apparatus according to claim 13, wherein,
forming the gap between the first image portion and the second image portion comprises:
scaling at least one of the first image portion and the second image portion.

16. The image verification apparatus according to claim 13, wherein, when executing at least one of the computer programs, the processor is configured to further perform operations comprising at least one of:
displaying an indicating device on the first image portion, and receiving the operation through the indicating device,
displaying a preset control, and receiving the operation through the preset control, and
receiving the first image portion and the second image portion from a server.

17. The image verification apparatus according to claim 13, wherein, when executing at least one of the computer programs, the processor is configured to further perform operations comprising:
sending the angle to a server, to cause the server to determine whether the angle matches with the original image.

18. The image verification apparatus according to claim 13, wherein, when executing at least one of the computer programs, the processor is configured to further perform operations comprising:
receiving, from a server, information indicating whether the angle matches with the original image.

* * * * *